Patented Nov. 17, 1936

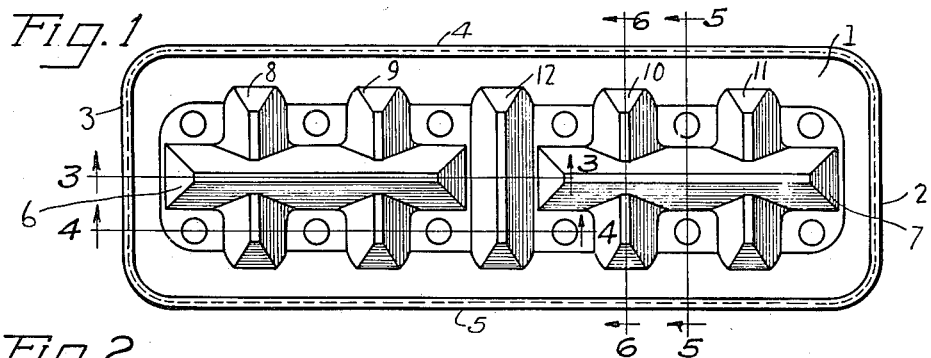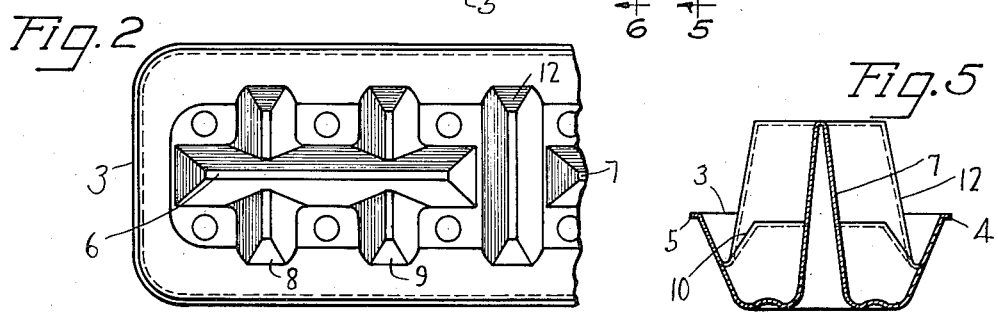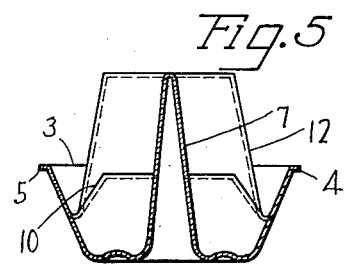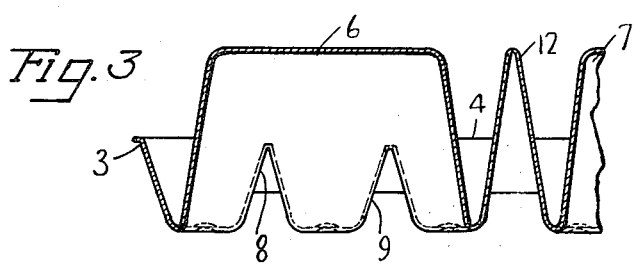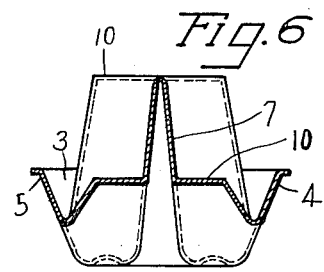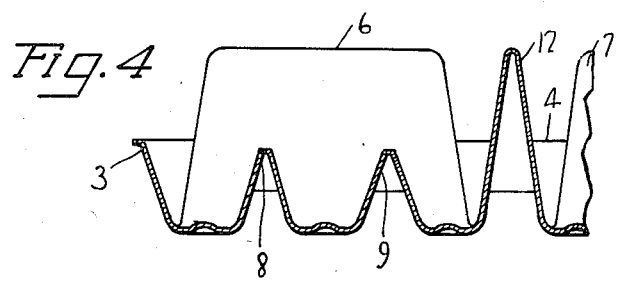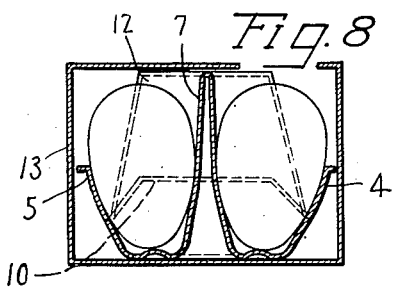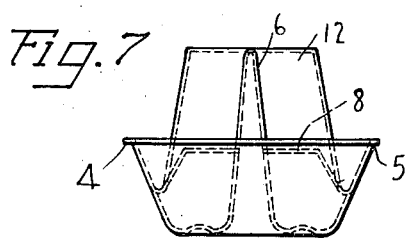

2,061,065

UNITED STATES PATENT OFFICE 2,061,065

EGG TRAY

William J. De Reamer, Crown Point, Ind., assignor to Mapes Consolidated Manufacturing Company, Griffith, Ind., a corporation of Delaware Application February 4, 1936, Serial No. 62,320

3 Claims. (Cl. 217—28)

This invention relates to egg trays, it more particularly relating to a tray which has interior longitudinal and transverse ribs forming egg cells.

The object of my invention is to provide a tray which will hold a comparatively small number of eggs, say one dozen, which can be readily inserted in a carton which is open at one end for shipping purposes and can also be used by the housewife for keeping eggs in the refrigerator.

A further object of the invention is to so construct the rib formation that some of the ribs at least will project above the walls of the tray so as to carry the weight of a top layer of eggs when packed in crates for shipment.

In the accompanying drawing:

Fig. 1 is a plan view of a tray embodying the improvements looking at the interior of the tray.

Fig. 2 is a bottom plan view of a portion of the tray.

Fig. 3 is a section on the line 3—3 of Fig. 1.

Fig. 4 is a section on the line 4—4 of Fig. 1.

Fig. 5 is a section on the line 5—5 of Fig. 1.

Fig. 6 is a section on the line 6—6 of Fig. 1.

Fig. 7 is an end view.

Fig. 8 is a section of the tray similar to Fig. 5, but showing the tray inserted in a carton, the carton being shown in section, and also showing eggs in the tray.

Referring to the drawing, 1 represents the bottom of the tray, 2 and 3 the ends and 4 and 5 the sides.

The interior of the tray has integrally formed hollow ribs, a pair of centrally arranged longitudinal ribs 6 and 7 and intersecting hollow transverse ribs 8, 9, 10 and 11 and also a transverse rib 12 arranged between the longitudinal ribs. The transverse ribs 8, 9, 10 and 11 are substantially the same height as the end and side walls of the tray, but the longitudinal ribs 6 and 7 and the centrally disposed transverse rib 12 are raised considerably above the walls of the tray; for instance, about 1¼" above the walls of the tray in a tray of the size described.

A tray as thus constructed is adaptable to be inserted in an open ended carton shown at 13 in Fig. 8. In shipment the raised longitudinal ribs and the raised transverse rib carry the weight of the top layer of eggs when packed in crates and the trays with the eggs therein packed in the cartons furnish a convenient carrying means for the purchaser of the eggs. The purchaser can thereafter remove the trays from the carton and use the trays for keeping the eggs in the refrigerator.

Having thus described my invention, I claim:

1. In an egg receptacle, a tray having end and side walls, a centrally arranged longitudinal rib, transverse ribs, said ribs coacting to form egg cells, said longitudinal rib and the centrally disposed transverse rib projecting above the sides and ends of the walls of said tray, the other of said transverse ribs being no higher than the walls of said tray, the major portion of said transverse ribs being each integrally attached from bottom to top thereof to said longitudinal rib.

2. In an egg receptacle, a tray having end and side walls, a pair of centrally arranged longitudinal ribs, transverse ribs, said ribs coacting to form egg cells, one of said transverse ribs being centrally arranged with respect to the length of the tray and lying between said longitudinal ribs, said longitudinal ribs and said centrally arranged transverse rib projecting above the walls of said tray, all of said transverse ribs save the centrally arranged one being each integrally attached from bottom to top to its companion longitudinal rib.

3. In an egg receptacle, a tray having end and side walls, a pair of centrally arranged longitudinal ribs, transverse ribs, said ribs coacting to form egg cells, one of said transverse ribs being centrally arranged with respect to the length of the tray and lying between said longitudinal ribs, said longitudinal ribs and said centrally arranged transverse rib projecting above the walls of said tray, the other of said transverse ribs being no higher than the walls of said tray, all of said transverse ribs save the centrally arranged one being each integrally attached from bottom to top to its companion longitudinal rib.

WILLIAM J. DE REAMER.